United States Patent [19]

Wollar

[11] 4,377,358

[45] Mar. 22, 1983

[54] EXPANSION FASTNER

[75] Inventor: Burnell J. Wollar, Barrington, Ill.

[73] Assignee: Phillips Plastics Corp., Phillips, Wis.

[21] Appl. No.: 220,908

[22] Filed: Dec. 29, 1980

[51] Int. Cl.³ .............................................. F16B 13/04
[52] U.S. Cl. ....................................... 411/15; 411/340
[58] Field of Search ........................ 411/15, 34, 35, 36, 411/37, 38, 39, 42, 43, 70, 63, 64, 65, 66, 68, 340, 341, 342, 343, 345, 346, 502, 508, 509, 510, 548, 61, 62

[56] References Cited

U.S. PATENT DOCUMENTS

| 964,226 | 7/1910 | Farrand | 411/342 |
|---|---|---|---|
| 1,203,669 | 11/1916 | Whiteside | 411/340 |
| 3,178,989 | 4/1965 | Siebol | 411/38 |
| 3,279,643 | 10/1966 | Amesbury et al. | 411/509 X |
| 3,350,976 | 11/1967 | Topf | 411/510 X |
| 3,481,242 | 12/1969 | Topf | 411/510 X |
| 3,651,734 | 3/1972 | McSherry | 411/15 |
| 3,698,279 | 10/1972 | Mallet | 411/34 |
| 3,959,853 | 6/1976 | Talan | 411/510 X |
| 4,122,538 | 10/1978 | Grittner | 411/509 X |
| 4,222,304 | 9/1980 | Yoshida et al. | 411/43 |
| 4,318,650 | 3/1982 | Llauge | 411/38 |

FOREIGN PATENT DOCUMENTS

| 1327260 | 4/1963 | France | 411/65 |
|---|---|---|---|
| 2161175 | 7/1973 | France | 411/61 |

Primary Examiner—Thomas J. Holko
Attorney, Agent, or Firm—James E. Nilles

[57] ABSTRACT

A one-piece, plastic fastener for lockable engagement in an opening in a panel, comprising a stem having an inner and an outer end. A pair of legs is formed integrally with and extends from the inner end, the legs being in parallelism with one another and in general axial alignment with the stem. Each of the legs has integrally formed therewith at a juncture an elongated arm positioned at an acute angle relative to its leg. The arms each have a free end which terminates in an integrally formed head portion, and the head portions are cooperatively engageable with one another and swingable about the juncture and with their respective arm towards one another to form a complete head having an orifice embracing the stem. The stem and arms are drivable into the opening in the panel to locate the head against an outer side of the panel. Serration means are provided between the head and the stem to maintain the fastener in lockable engagement with the panel.

5 Claims, 7 Drawing Figures

EXPANSION FASTNER

BACKGROUND OF THE INVENTION

The invention relates generally to expandable fasteners. In particular, it relates to a fastener suitable for connecting a plurality of panels where part of the fastener will engage one of the panels along an inaccessible side, and the fastener must therefore be capable of being locked into place from the accessible side.

Prior art devices have been proposed, but have several disadvantages. Typical fasteners are shown in U.S. Pat. No. 3,651,734 issued to McSherry on Mar. 28, 1972. Most of the McSherry fasteners are relatively inconvenient to use requiring that a tool be inserted through a hole in the one-piece fastener head to move the arms into an over-center position whereby a portion of each arm contacts one side of the panel to secure the fastener in a panel opening. Those fasteners not requiring an insertable tool to expand the panel-engaging arms either require a nut and bolt means or on an integral pivot pin and plunger. Rotation of the bolt is a time-consuming task, and usually a tool is required to turn it. The plunger-actuatable fastener is more easily used, but is not a one-piece fastener, and further has a smooth, non-serrated shaft which does not engage the head of the fastener to prevent collapse of the arms of the fastener in place. Instead, as in the other fasteners of McSherry, the collapse of the panel-engaging arms is prevented only by forces created by the flexing of what are typically called toggle members or arms, and flexible members. Similarly, the plunger-actuatable fastener is non-permanently engaged to the panel opening, the head of the plunger being in non-flush engagement with the head of the fastener and permitting the plunger to be grasped and pulled axially and away from the head to cause collapse of the arms and permit removal of the fastener. The non-flush fit of the plunger head relative to the fastener head is also undesirable with respect to appearance and utility.

SUMMARY OF THE INVENTION

The present invention provides a one-piece, plastic fastener for lockable engagement in an opening in a panel, and comprises a stem having an inner and an outer end. A pair of legs is formed integrally with and extends from the inner end, the legs being in parallelism with one another and in general axial alignment with the stem. Each of the legs has integrally formed therewith at a juncture an elongated arm, positioned at an acute angle relative to its leg. The arms each have a free end which terminates in an integrally formed head portion, and the head portions are cooperatively engageable with one another and swingable about the juncture and with their respective arm towards one another to form a complete head having an orifice embracing the stem. The stem and arms are driveable into the opening in the panel to locate the head against an outer side of the panel. Serration means are provided between the head and the stem to maintain the fastener in lockable engagement with the panel.

The fastener is advantageous over the prior art devices in several ways. First, it includes an integral stem for expanding the fastener once it has been inserted through the panel opening. No tool is required to contact the legs and move them from a position in substantial axial alignment with a panel opening to a position where the legs are bent along their lengths. Second, the fastener is of simple, one-piece construction and requires no assembly of separately manufactured component parts. Thirdly, the fastener has a plurality of serrations along its stem.

When the stem of the present invention is pushed inwardly to engage the head, the serrations are locked onto the head to maintain the fastener in a permanent locked position on the panel. With the fastener in this locked position, the outer end of the stem is flush with the fastener head, and there is no need to clip off a protruding portion of the stem from the fastener in place to obtain the appearance and utility advantages of the flush relationship.

Other objects and advantages of the invention will appear throughout the specification.

DESCRIPTION OF A PREFERRED EMBODIMENT

Figure 1:
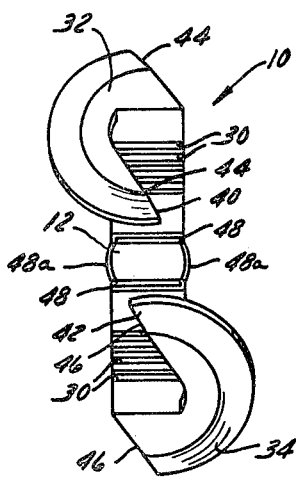
FIG. 1 is a front elevational view of a fastener constructed in accordance with the invention and showing the two head portions in a spaced-apart relationship.
Figure 2:
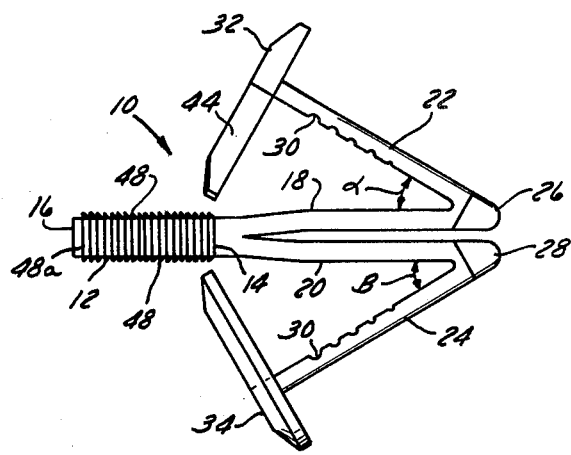
FIG. 2 is a side view of the fastener shown in FIG. 1.

The novel fastener 10 is shown in FIGS. 1 and 2 as it appears after removal from a two-plate mold typically of high cavity density and low cost, from which it can be fabricated. The fastener 10 can be constructed of any one of several plastics, as for example polyethylene or nylon, and may include a stem 12 having an inner end 14 and an outer end 16. A pair of legs 18 and 20 is formed integrally with and extends from the inner end 14, the legs being in parallelism with one another and in general axial alignment with the stem 12. The legs 18 and 20 are pivotable relative to and away from one another in a manner to be explained below. The legs 18 and 20 each have an elongated arm 22 and 24 integrally formed with the leg and at a juncture 26 and 28. The arm extends from its juncture and back towards the outer end 16 of the stem 12, and the angles alpha ($\alpha$) and beta ($\beta$) formed by the arms 18 and 20 with their respective legs 22 and 24 are acute.

The arms may include a plurality of spaced-apart indentations 30 along their lengths. Indentations 30 permit bending of the arms in a predetermined manner as will be explained below and which permits lockable engagement of the fastener 10 in one or more panels when the stem 12 is driven into the panel openings.

Figure 4A:
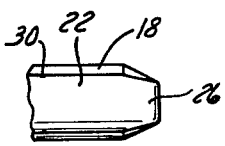
FIG. 4a is a fragmentary view of the fastener end, taken along line 4a—4a of FIG. 4.
Figure 3:
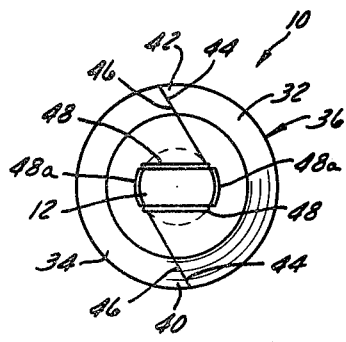
FIG. 3 is a front elevational view of the fastener shown in FIG. 1, with the two head portions combined to form a head that embraces the fastener stem.
Figure 4:
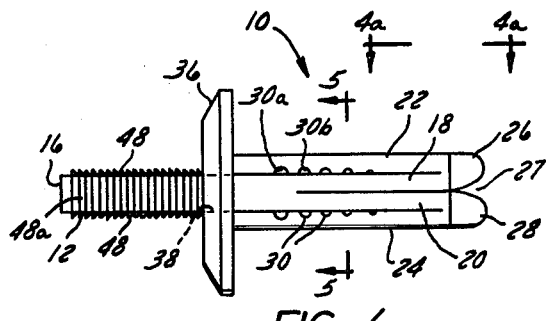
FIG. 4 is a side view of the fastener shown in FIG. 3.
Figure 5:
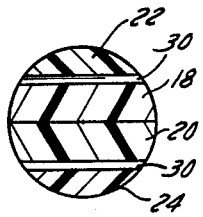
FIG. 5 is a cross-sectional view of the fastener of FIG. 4 taken along the line 5—5 on an enlarged scale.

Each of the arms 22 and 24 also has a free end which terminates in an integrally formed head portion 32 and 34. The two head portions 32 and 34 are spaced apart when the fastener 10 is removed from the two plate mold, but the head portions are cooperatively engageable to form a head 36 having an orifice 38 embracing the stem 12 (FIGS. 3 and 4). The head may be formed by grasping the head portions 32 and 34 and squeezing them together and with a slight twisting motion so that the tips 40 and 42 of the head portions will clear the stem. The orifice created when the head portions 32 and 34 have been brought together extends through the head 36 and is of the same size and cross-section as the stem 12. When the two head portions are squeezed together to form the fastener shown in FIGS. 3 and 4, the fastener 10 is ready for insertion into the opening of a panel or panels. As the head portions 32 and 34 swing inwardly towards one another and about junctures 26 and 28, their respective arms 22 and 24 also swing about the junctures and towards one another until reaching the collapsed position of FIG. 4 in which the legs are adjacent the arms. The arms and legs are formed so that in their collapsed state they cooperatively provide a round cross-section (FIG. 5) making the fastener 10 suitable for insertion in the typical round panel opening. The junctures 26 and 28 combine to form a tapered fastener end which is tapered or chamfered (FIG. 4a) to permit easier insertion of the fastener into a panel opening.

The arms 22 and 24 in this collapsed position are inclined to push outwardly on the engaged head portions and towards their natural, unbiased position as shown in FIG. 2. These forces are resisted by the interengageable bevelled edges 44 and 46 of the head portions. As may be seen in the circular head 36 of FIG. 3, the bevelled edges 44 and 46 are oriented in a non-radial manner along the head 36.

Serration means are provided between the head and the stem to maintain the fastener in lockable engagement with the panel. In this embodiment, these comprise a plurality of serrations 48 along the stem 12 for extending through the orifice 38 and engaging the head, the serrations 48 being located between the stem's inner 14 and outer ends 16. The serration 48a nearest the outer end 16 of the stem and which is not within the orifice 38 engages the underside of head 36, or that side of the head abutting a panel 50 to further aid in maintaining the fastener in lockable engagement with the panel.

The fastener is engageable with one or more panels 50 and 52, and may be used to hold a thin fabric or plastic layer onto a panel or to hold two or more panels together. The fastener 10 in its collapsed position as shown in FIG. 4 is driven through coaxial, circular openings 54 and 56 of panels 50 and 52. As may be seen in FIG. 7, the serrations 48 not within the orifice 38 but instead within openings 54 and 56 push outwardly against adjacent arms 22 and 24 to thereby force the arms against the perimeters of openings 54 and 56, tightening the grip of the fastener to those openings.

Figure 7:
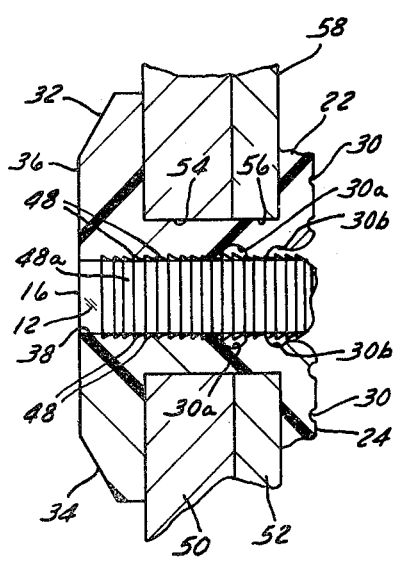
FIG. 7 is a fragmentary, cross-sectional view of a portion of the fastener of FIG. 6 and on an enlarged scale, showing the engagement of the serrations on the stem with the fastener head to maintain the fastener in lockable engagement with the panel.
Figure 6:
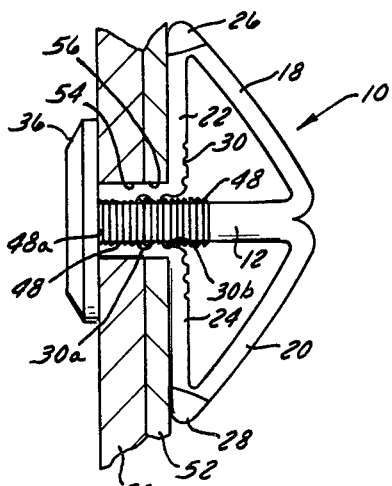
FIG. 6 is a fragmentary view, partially in section, of the fastener of FIGS. 3 and 4 inserted through the openings of a pair of panels and with the stem extending through the orifice of the head to cause the arms to bend about their indentations and to cause the legs to pivot relative to and away from one another.

When the head 36 is located against the outer side of panel 50, the fastener is in an expandible position. Typically, the fastener 10 is driven through the opening with a mechanical device which also engages the outer end 16 of the stem 12. The mechanical device may then be actuated to push on the outer end 16 and thereby drive the stem 12 into the orifice 38 (FIGS. 6 and 7). The axial movement of the stem 12 into the orifice 38 and towards the legs 18 and 20 causes the legs to pivot relative to and away from one another, causing the breaking away of any flashing at the tip end 27. The indentations 30 in arms 22 and 24 decrease in size as their distance from the head and along the arm increases. The larger the indentation, the smaller the cross-sectional area of the portion of the arm adjacent that indentation and thus the easier that the arm can bend adjacent that indentation. As the stem 12 is driven through the panel openings and the orifice to thereby cause the pivotal movement of the legs, the arms 22 and 24 also bend so that the junctures 26 and 28 and the arms approach the inside 58 wall of the panels at the generally inaccessible portion behind the panels. In this embodiment, the expanded fastener 10 is shown with its arms 22 and 24 and junctures 26 and 28 abutting the inside 58 of the panels, although the arms in practice may not bend as much as shown. The indentation 30a nearest the head 36 is entirely within openings 54 and 56 and the arms cannot thus bend about this indentation. Indentation 30b is the largest about which the legs can bend because that indentation is not entirely within the panel openings, and the legs 22 and 24 will bend adjacent that point because the leg at 30b offers the least resistance to bending.

The fastener 10 is maintained in lockable engagement with the panels 50 and 52 for several reasons. The bending of the arms 22 and 24 causes them to engage the edges of opening 56 adjacent the inside 58 of the panels. The expansion of the legs 18 and 20 away from one another and about their pivot point increases the tension of the arms at this edge. The serrations 48 on stem 12 press-fit or "dig" into the portion of the head forming orifice 38, and thereby prevent the stem from extruding back out of the orifice once the outer end 16 of the stem 12 is pressed flush with the head. Once expanded, the legs 18 and 20 have compressive forces applied thereto and any attempt to or force tending to remove the fastener only increases these compressive forces.

RECAPITULATION

The novel one-piece fastener includes an integral stem to facilitate expansion thereof without the need for a separate expansion tool. The fastener is permanently engaged to the panel, and serration means between the fastener head and stem prevent the stem, once pushed inwardly and towards the inaccessible area behind the panels, from extruding or being pulled back out of the fastener orifice. The flush relationship of the stem and head when the fastener is lockably engaged with the panels eliminates the need to clip off a protruding stem end and its attendent scrap problem.

What I claim is:

1. A one-piece, plastic fastener for lockable engagement in an opening in a panel, said fastener comprising a stem having an inner end and an outer end, a pair of legs formed integrally with and extending from said inner end in parallelism with one another and in general axial alignment with said stem, each of said legs having an elongated arm integrally formed therewith at a juncture, said arm positioned at an acute angle relative to its leg, said arms each having a free end which terminates in an integrally formed head portion, said head portions being cooperatively engageable with one another along a plurality of bevelled edges, said bevelled edges oriented in a non-radial manner along said head portions, said head portions being swingable about said juncture and with their respective arm towards one another to form a complete head having an orifice embracing said stem, said stem and arms being drivable into said opening in said panel to locate said head against an outer side of said panel, and serration means between said head and said stem to maintain said fastener in said lockable engagement with said panel.

2. The fastener set forth in claim 1, wherein said serration means are attached to said stem and extend through said orifice and engage said head.

3. The fastener set forth in claim 1, wherein said arms include a plurality of spaced-apart indentations for permitting bending of said arms in a predetermined manner when said stem is driven into said opening.

4. A one-piece, plastic fastener for lockable engagement in an opening in a panel, said fastener comprising a stem having an inner end and an outer end, a pair of legs formed integrally with and extending from said inner end in parallelism with one another and in general axial alignment with said stem, each of said legs having an elongated arm integrally formed therewith at a juncture, said arm positioned at an acute angle relative to its leg, said arms each having a free end which terminates in an integrally formed head portion, said head portions being cooperatively engageable with one another along a plurality of bevelled edges, said bevelled edges oriented in a non-radial manner along said head portions, said head portions being swingable about said juncture and with their respective arm towards one another to form a complete head having an orifice embracing said stem, said stem and arms being drivable into said opening in said panel to locate said head against an outer side of said panel, said arms including a plurality of spaced-apart indentations for permitting bending of said arms in a predetermined manner when said stem is driven into said opening, the size of said indentations decreases as their distance from said head and along said arm increases, and serration means between said head and said stem to maintain said fastener in said lockable engagement with said panel.

5. The fastener set forth in claim 4, wherein said serration means are attached to said stem and extend through said orifice and engage said head.

* * * * *